(12) United States Patent
Wu et al.

(10) Patent No.: US 9,060,164 B2
(45) Date of Patent: Jun. 16, 2015

(54) INTELLIGENT USE OF SCENE AND TEST PATTERN ANALYSES FOR TRAFFIC CAMERA DIAGNOSTICS

(75) Inventors: Wencheng Wu, Webster, NY (US); Edul N. Dalal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 485 days.

(21) Appl. No.: 13/610,907

(22) Filed: Sep. 12, 2012

(65) Prior Publication Data

US 2014/0071281 A1 Mar. 13, 2014

(51) Int. Cl.
*H04N 17/00* (2006.01)
*G08G 1/04* (2006.01)

(52) U.S. Cl.
CPC .............. *H04N 17/002* (2013.01); *G08G 1/04* (2013.01)

(58) Field of Classification Search
None
See application file for complete search history.

(56) References Cited

U.S. PATENT DOCUMENTS

2013/0335579 A1* 12/2013 Raghavan et al. ............ 348/188

OTHER PUBLICATIONS

U.S. Appl. No. 13/527,673, filed [unknown], titled "Camera Calibration Application" by Martin H. Hoover et al.
U.S. Appl. No. 13/371,068, filed Feb. 10, 2012, titled "Traffic Camera Diagnostics Via Test Targets", by Wu et al.
U.S. Appl. No. 13/472,126, filed May 15, 2012, titled "Detection of Near-Field Camera Obstruction", by Liu et al.
U.S. Appl. No. 13/524,404, filed Jun. 15, 2012, titled "Detection of Camera Misalignment", by Raghavan et al.
Shoepflin et al., "Dynamic Camera Calibration of Roadside Traffic Management Cameras for Vehicle Speed Estimation," IEEE Trans. on Intelligent Transportation Systems, 4(2), 90-98 (2003).

* cited by examiner

*Primary Examiner* — Dave Czekaj
*Assistant Examiner* — Nam Pham
(74) *Attorney, Agent, or Firm* — Fay Sharpe LLP

(57) ABSTRACT

A method for determining a response to misalignment of a camera monitoring a desired area includes acquiring temporal related frames from the camera including a reference frame. A pixel location is determined of a reference object from the frames. Using the pixel location of the reference object, a displacement of the camera between a current frame and the reference frame is determined. For the displacement exceeding a first threshold, a new displacement of the camera is measured by introducing at least one additional object to a camera field of view and comparing the new displacement to a second threshold. For the new displacement not exceeding the second threshold, the camera is recalibrated using a determined pixel location and a physical location of the at least one additional object. For the new displacement exceeding the second threshold, notification is provided of a misalignment to an associated user device.

17 Claims, 4 Drawing Sheets

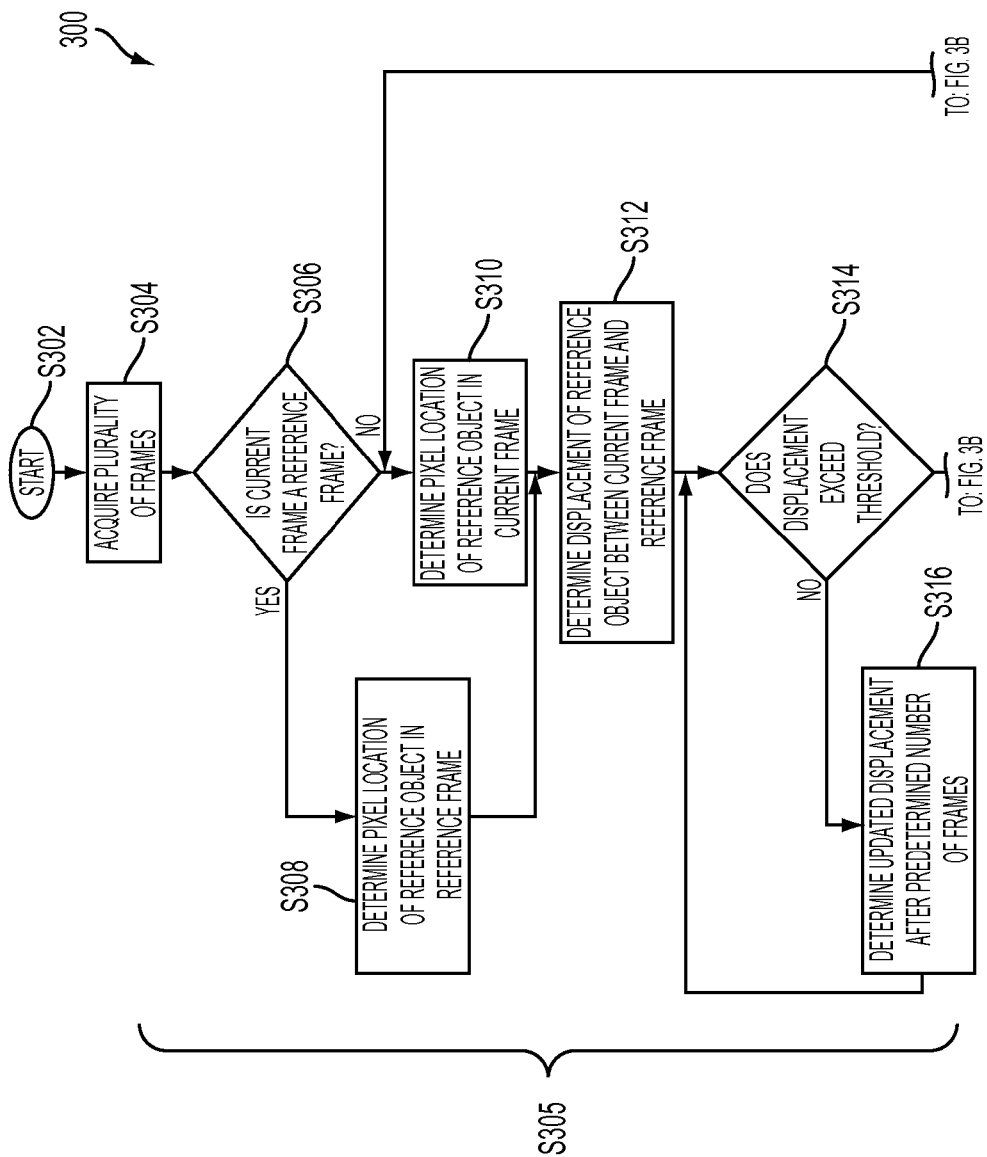

INTELLIGENT USE OF SCENE AND TEST PATTERN ANALYSES FOR TRAFFIC CAMERA DIAGNOSTICS

BACKGROUND

The present disclosure relates to a system and method for performing camera diagnostics. The system operates using a multiple phase approach to detect and confirm camera deterioration. The present disclosure finds application in traffic surveillance. However, it is appreciated that the present exemplary embodiments are also amendable to other like applications.

Conventional traffic cameras are used to monitor traffic flow and survey vehicle compliance with traffic laws, rules, and regulations. A conventional traffic camera can support a variety of surveillance tasks. Generally, this type of camera selectively captures video of a scene that is being surveyed. These cameras may then transmit image data to a remote server device for further processing, or may perform some or all of the processing on-board. Because the image data is often used for fee collection and traffic enforcement, the ability of the camera to accurately render an image is essential to the performance of a traffic monitoring system.

However, performance of a camera deteriorates over time. The deterioration can be gradual or sudden and can affect the camera's ability to perform its desired function. One example of decreased performance results when the camera captures blurred images caused by a dirty or smudged lens. Deterioration can also result from camera misorientation, which may be caused, for example, by impact to the camera housing. Other examples of deterioration include low image contrast resulting from flash defects and failures and near field camera obstruction resulting from a variety of causes.

While total failure can easily be detected by automatic means, subtle deterioration is more difficult to detect and is further complicated by the many possible sources of deterioration including, for example, weather, vehicle speeds, and vehicle conditions. As an example, displacement of a traffic camera's field of view (FOV) can occur when the camera position and/or orientation is moved by a force of wind, accumulated snow/ice, and/or inadequately secured camera mounts, etc. Because traffic cameras are positioned in or near traffic flow, routine on-site camera inspections are difficult. On-site inspections can disrupt traffic and/or place technicians at risk of oncoming traffic.

Conventional approaches for detecting subtle deterioration in traffic camera diagnostics include test pattern or scene analysis. The test pattern approach uses images with specially designed and well characterized objects that are placed in the field of view of the camera to detect and/or quantify output quality by applying a process similar to one used to evaluate the quality of images rendered by multifunction printer devices. The test patterns are objects with known patterns (e.g. bright reflectors on a 1 ft×1 ft grid) or with readily identified features (e.g. dark painted lines of known dimensions on a plane surface) placed on, for example, a vehicle that travels across the scene that is being surveyed by the traffic camera. However, the labor and resources required for implementing the traffic test pattern approach are significant. Because test pattern analysis is expensive, it should not be invoked unless clearly needed.

The alternative approach is scene analysis, which performs image analysis on all or part of the scene that is captured by the camera. A common shortcoming of scene-dependent image analysis is its tendency to yield lower quality and scene-dependent diagnostics signals that are sub-optimal (or even intractable) for diagnostics. This drawback can be worse if this approach is used for measuring small amounts of camera misalignment (e.g. gradual deterioration over time). Furthermore, because scene elements and noise effects can confound diagnostic signals that are extracted from the image, the performance of scene analysis for camera diagnostics varies depending on the scene.

Gaps remain and limit the capability of traffic camera diagnostics when these conventional approaches are used independent of one another. A method and system for performing traffic camera diagnostics are therefore desired which maximize the strengths of both approaches by using scene analysis for predicting or identifying a potential misalignment and then using test pattern analysis to make a final decision and/or correction.

BRIEF DESCRIPTION

One embodiment of the present disclosure relates to a method for determining a response to misalignment of a camera monitoring a desired area. The method includes acquiring a plurality of temporal related frames from the camera. One of the frames is a reference frame. The method further includes determining a pixel location of at least one reference object from the frames. Using the pixel location of the at least one reference object, the method includes determining a displacement of the camera between a current frame and the reference frame. The method includes comparing the displacement to a first threshold. For the displacement exceeding the first threshold, the method includes measuring a new displacement of the camera by introducing at least one additional object to a camera field of view and comparing the new displacement to a second threshold. For the new displacement not exceeding the second threshold, the method includes automatically recalibrating the camera using a determined pixel location and corresponding known physical location of the at least one additional object. For the new displacement exceeding the second threshold, the method includes providing suitable notification of a detected misalignment to an associated user device.

Another embodiment of the present disclosure relates to a system for determining a response to misalignment of a camera monitoring a desired area. The system includes a computer having an image capture module, an alignment determination module, a diagnostic response module and a processor adapted to process the modules. The image capture module is adapted to acquire a plurality of temporal related frames from the camera, wherein one of the frames is a reference frame. The alignment determination module is adapted to determine a pixel location of at least one reference object from the plurality of frames. Using the pixel location of the at least one reference object, the alignment determination module determines a displacement of the camera between a current frame and the reference frame. The alignment determination module compares the displacement to a first threshold. For the displacement exceeding the first threshold, the module measures a new displacement of the camera by introducing at least one additional object to a camera field of view. The diagnostic response module then compares the new displacement to a second threshold. For the new displacement not exceeding the second threshold, the diagnostic response module automatically recalibrates the camera using a determined pixel location and corresponding known physical location of the at least one additional object. For the new displacement exceeding the second threshold, the diagnostic response module provides suitable notification of a detected misalignment to a user device.

DETAILED DESCRIPTION

The present embodiment is directed to a system and method for performing traffic camera diagnostics using a multi-level approach including scene and test pattern analyses. Namely, the system uses thresholding results of a scene analysis to determine a possible camera fault and uses thresholding results of a test pattern analysis to confirm the suspected camera fault.

Figure 1:
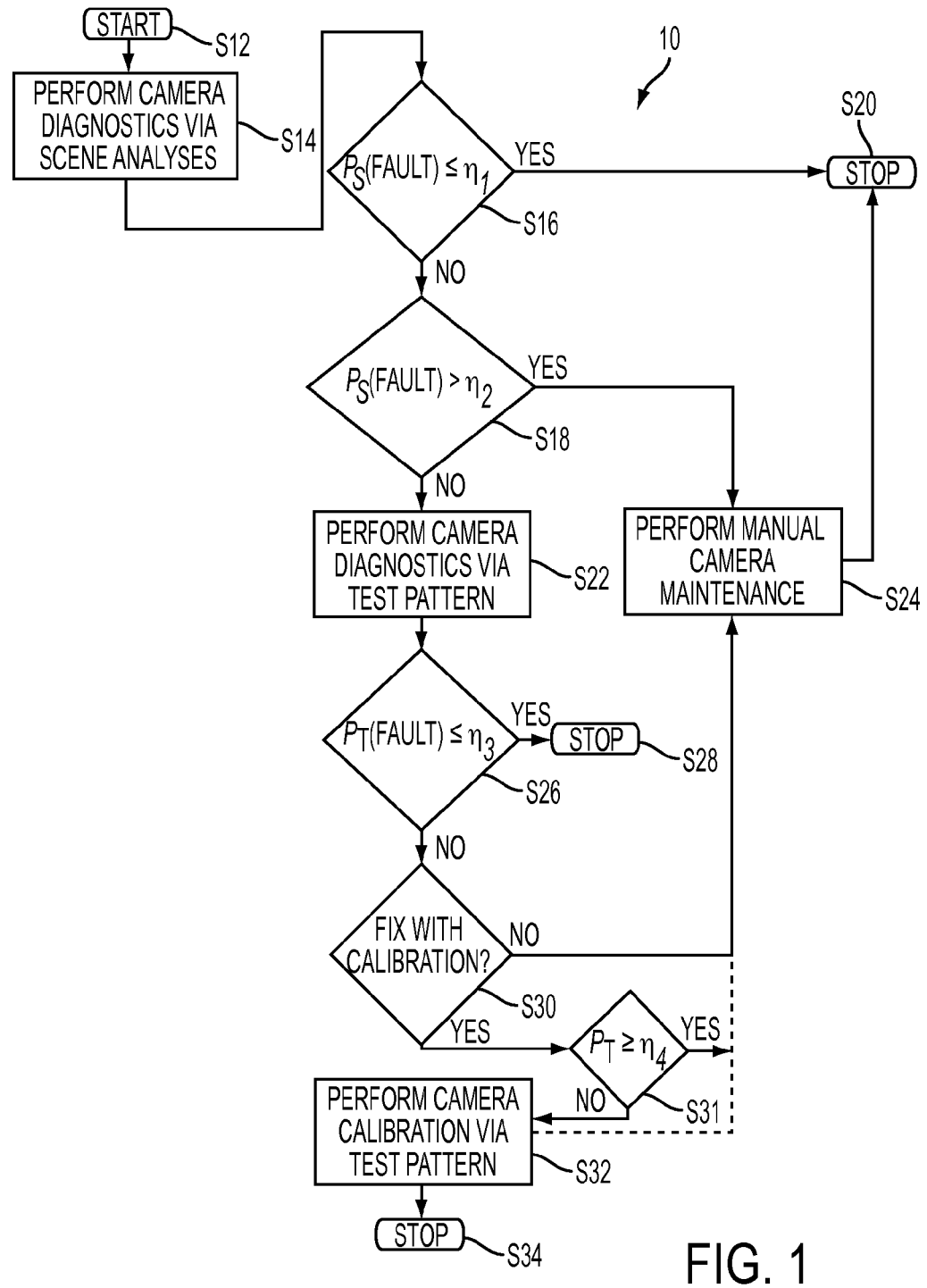
FIG. 1 is an overview of a method for performing traffic camera diagnostics using a multi-level approach for determining a fault possibility and confirming the fault condition.

FIG. 1 provides an overview of the method 10. The system starts a diagnostic routine at S12. At S14, a scene analysis is performed on data that is extracted from an image frame of the scene that is captured by the camera. The scene analysis is used to determine a severity (i.e., a probability and/or likelihood) of the camera fault $P_S$ being tested, such as, in one example, the camera misalignment and/or displacement. The subscript S is used to denote that the camera fault $P_S$ is determined from scene analysis. The camera fault $P_S$ is compared to first and second thresholds $\eta_1$ and $\eta_2$ at S16, S18, whereby the second threshold $\eta_2$ is significantly larger than the first threshold $\eta_1$. For the fault $P_S$ not exceeding the first threshold ($P_S \leq \eta_1$) (YES at S16), no further action is required (S20). For the fault $P_S$ exceeding the second threshold ($P_S > \eta_2$) (YES at S18), a maintenance crew is dispatched to physically correct the camera fault or replace the camera at S24. This step is optional and is used to dispatch the maintenance crew directly for the situation where the camera fault is so severe as to unequivocally be detected via scene analysis alone. For the fault $P_S$ exceeding the first threshold but not exceeding the second threshold ($\eta_1 < P_S \leq \eta_2$) (NO at S16 and S18), appropriate test patterns are deployed to the field for performing more rigorous camera diagnostics at S22 to determine severity of the camera fault $P_T$. The subscript T is used to denote that camera fault $P_T$ is determined from test pattern analysis. The results of the test pattern analysis are used to confirm the suspected fault $P_S$ once the initial testing has revealed its possibility. If the resulting severity $P_T$ from the test pattern analysis S22 does not exceed a third threshold ($P_T \leq \eta_3$) (YES at S26), then the camera is operating within specifications, and no further action is required, S28. If $P_T$ from S22 exceeds the third threshold (NO at S26), i.e., the camera fault detected from scene analysis is further confirmed by the test pattern analysis, the diagnostics continue to S30. At S30, the system determines whether or not to dispatch a maintenance crew for correcting the fault. This determination is made because in some cases, such as when a camera fault is a modest displacement error, it may be possible to compensate for the fault through recalibration using the camera fault $P_T$ data, and it may not be necessary to send out the maintenance crew. If it is not possible to perform the automatic calibration (NO at S30), then the maintenance crew is dispatched to correct the fault at S24. Although some faults, such as camera misalignment, can be corrected by automatic calibration S32, it might be desirable to maintain camera conditions close to an initial installation state. Therefore, it may be useful to compare $P_T$ to a fourth threshold $\eta_4$ at S31. If the camera fault $P_T$ does not exceed the fourth threshold $\eta_4$ (NO at S31), the process continues to S32 for correcting the identified camera fault via calibration. If the camera fault $P_T$ exceeds the fourth threshold $\eta_4$ (YES at S31), the change in the camera condition is too large compared to the condition in the reference frame. The process continues to S24 to dispatch the maintenance crew to correct the camera fault. The method ends at S34.

Because camera misalignment is a common fault and can well utilize the proposed method, the following more detailed description of the diagnostic method focuses on this specific camera fault. It is however understood that other camera faults, such as out-of-focus or near-field obstruction of the camera (e.g. due to snow, fog etc.), can be applied as well.

Figure 2:
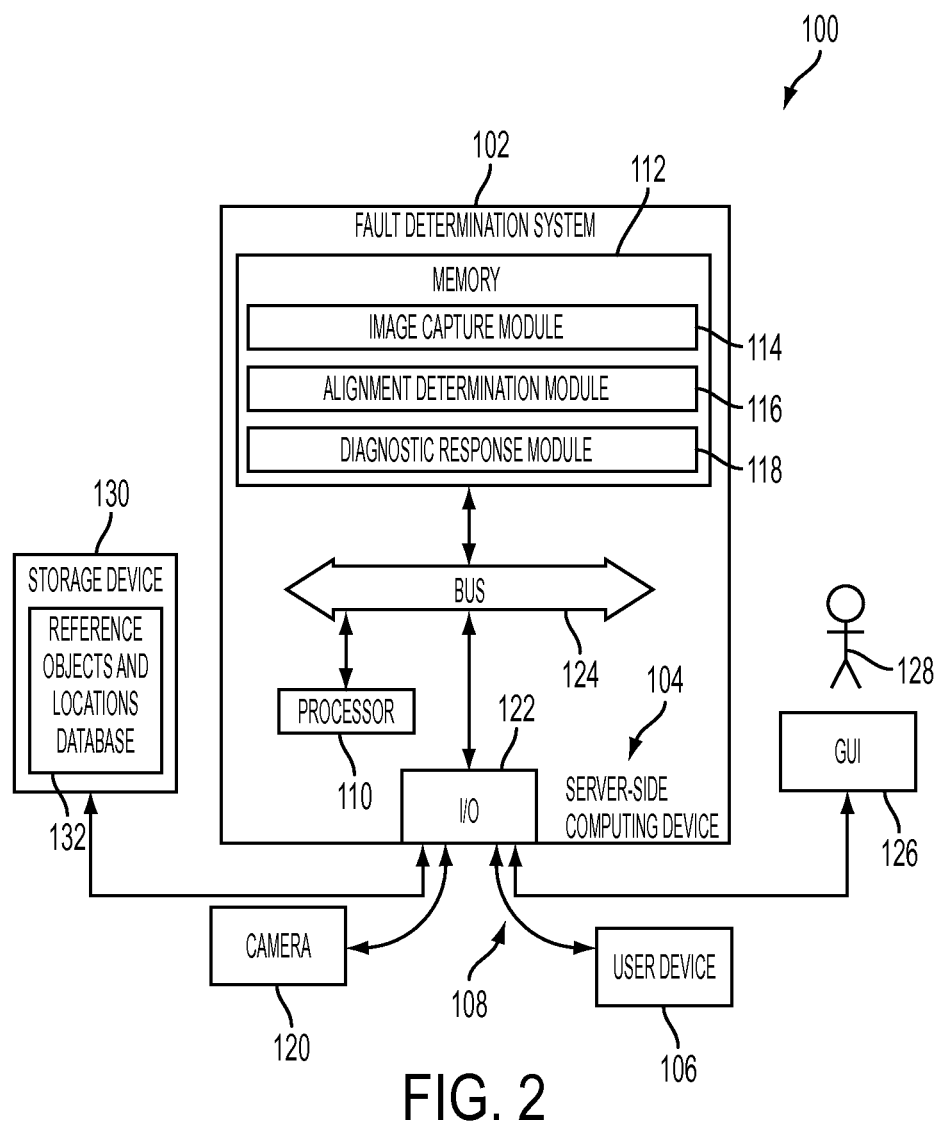
FIG. 2 is a schematic illustration of a traffic camera diagnostic system in one aspect of the exemplary embodiment.

FIG. 2 is a functional block diagram of a traffic camera diagnostic system 100 in one exemplary embodiment. The system 100 may include a deterioration determination system 102, hosted by a computing device 104, such as a server computer at the service provider site, and a user device 106, hosted by a computing device at a customer site, such as a server, which are linked together by communication links 108, referred to herein as a network. These components are described in greater detail below.

The fault determination system 102 illustrated in FIG. 2 includes a processor 110, which controls the overall operation of the fault determination system 102 by execution of processing instructions, which are stored in memory 112 connected to the processor 110.

The camera diagnostic process disclosed herein is performed by the processor 110 according to the instructions stored in the memory 112. In particular, the memory 112 stores image capture module 114, alignment determination module 116, and diagnostic response module 118.

The illustrated image capture module 114 acquires a plurality of temporal related frames from a camera 120.

The alignment determination module 116 performs a first phase of the diagnostic routine. More specifically, the alignment determination module 116 performs a scene analysis to detect a potential fault. The module 116 determines a pixel location of at least one reference object from the plurality of frames. Using the pixel location of a reference object, the alignment determination module 116 determines a displacement of the object between a current frame and the reference frame. The module 116 compares the displacement to a threshold. For the displacement not exceeding the threshold, the alignment determination module 116 determines an updated displacement of the object after a predetermined number of frames. For the displacement exceeding the threshold, the alignment determination module 116 transmits the displacement information to the diagnostic response module 118.

The diagnostic response module 118 performs a second phase of the diagnostic routine. More specifically, the diagnostic response module 118 performs a traffic test pattern analysis to confirm the suspected fault. The module 118 measures a new displacement of the camera by introducing at least one additional object to a camera field of view. More specifically, in one embodiment, a plurality of frames is acquired while a test pattern is present in the camera FOV, and test pattern analysis is performed to determine a new displacement of the camera, preferably in terms of real-world distance units rather than pixel units. The module 118 compares the new displacement to a second threshold. For the new displacement neither meeting nor exceeding the second threshold, the diagnostic response module 118 automatically recalibrates the camera using a determined pixel location and corresponding known physical location of the additional object, i.e. test pattern mentioned above. For the new displacement exceeding the second threshold, the module 118 provides suitable notification of a detected misalignment to the user device 106.

The fault determination system 102 also includes one or more communication interfaces (I/O), such as network interfaces 122 for communicating with external devices, such as the user device 106. The various hardware components 110, 112, 122 of the fault determination system 102 may all be connected by a bus 124.

With continued reference to FIG. 2, the fault determination system 102 is communicatively linked to a user interface device (GUI) 126 via a wired and/or wireless link. In various embodiments, the user interface device 126 may include one or more of a display device, for displaying information to users, such as a notification of camera misalignment to a human operator 128 for review, and a user input device, such as a keyboard or touch or writable screen, for inputting instructions, and/or a cursor control device, such as a mouse, trackball, or the like, for communicating user input information and command selections to the processor 110. Specifically, the user interface device 126 includes at least one of an input device and an output device, both of which include hardware, and which are communicatively linked with the server 104 via wired and/or wireless link(s).

With continued reference to FIG. 2, the traffic camera diagnostic system 100 includes a storage device 130 that is part of or in communication with the deterioration determination system 102. In one embodiment, the fault determination system 102 can be in communication with a server (not shown) that hosts storage device 130, for storing a reference objects and locations database 132.

While the computing device 104 may be linked to as few as one camera 120, in general, it can be linked to a plurality of cameras. The camera 120 is not limited to any one type of camera. Rather, still cameras and video cameras are contemplated for surveying a desired region. The camera 120 is adapted to capture a plurality of image frames and transmit the image and/or video data to the deterioration determination system 102. In the contemplated embodiment, the camera 120 can be used for speed enforcement applications, but the purpose of the surveillance is not limited to any one application.

The memory 112, 130 may represent any type of tangible computer readable medium such as random access memory (RAM), read only memory (ROM), magnetic disk or tape, optical disk, flash memory, or holographic memory. In one embodiment, the memory 112, 130 may each comprise a combination of random access memory and read only memory. The digital processor 110 can be variously embodied, such as by a single-core processor, a dual-core processor (or more generally by a multiple-core processor), a digital processor and cooperating math coprocessor, a digital controller, or the like. The digital processor 110, in addition to controlling the operation of the respective deterioration determination system 102, executes instructions stored in memory 112, 130 for performing the parts of the method outlined below.

The software modules as used herein, are intended to encompass any collection or set of instructions executable by the fault determination system 102 so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The communication interfaces 122 may include, for example, a modem, a router, a cable, and and/or Ethernet port, etc.

As will be appreciated, while two computing devices 104, 106 are illustrated by way of example, the system 100 may be hosted by fewer or more linked computing devices. Each computing device may include, for example, a server computer, desktop, laptop, or tablet computer, smartphone or any other computing device capable of implementing the method described herein.

Figure 3B:
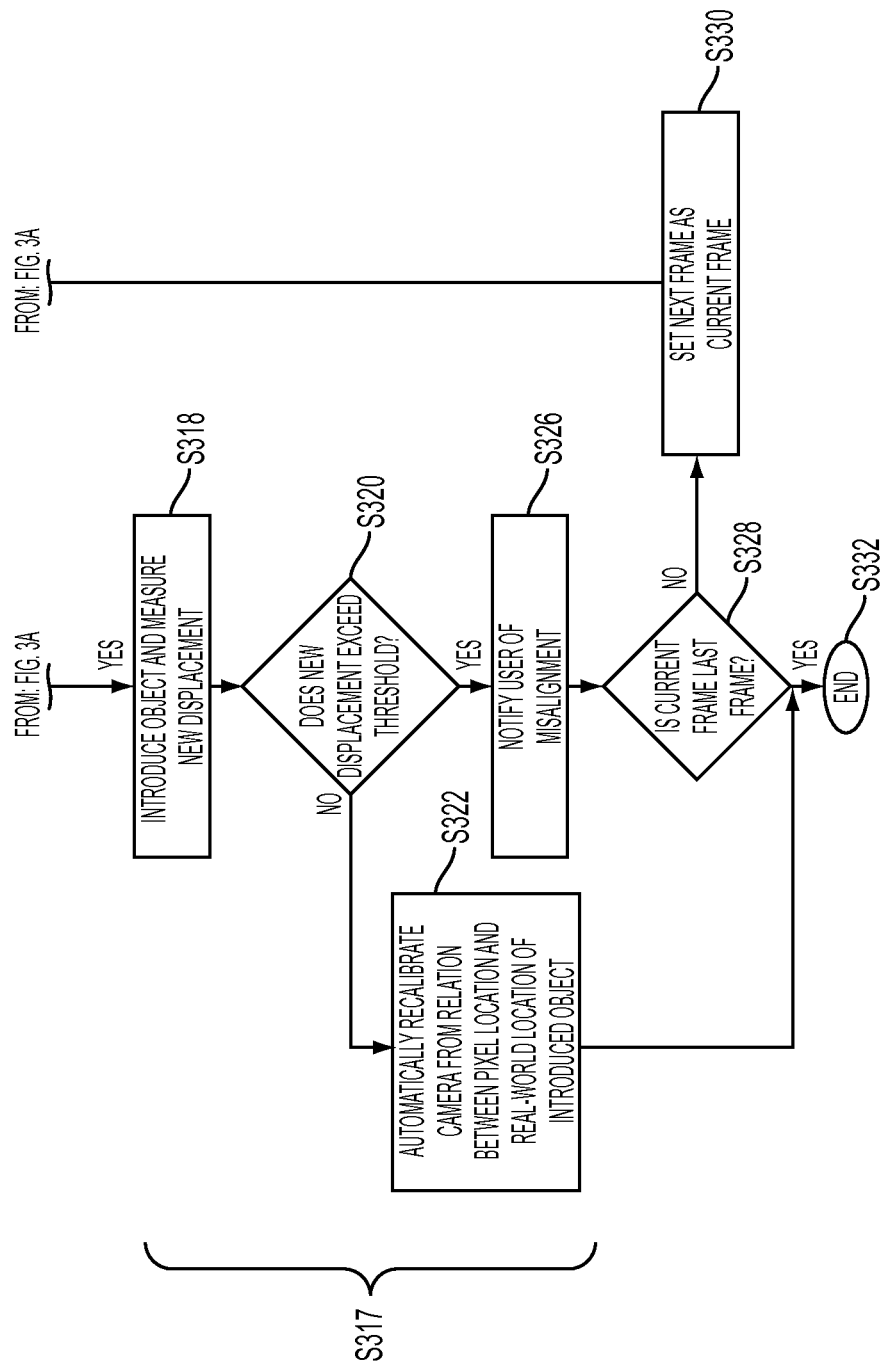
FIG. 3 is a flow chart illustrating an exemplary method for determining and handling a traffic camera misalignment condition according to another aspect of the exemplary embodiment.

FIG. 3 is a flow chart illustrating an exemplary method 300 for determining and handling a traffic camera fault condition according to another aspect of the exemplary embodiment. While a diagnostic routine can fail outright when a fault is large and/or significant enough, gradual faults can be less readily apparent, even if image frames undergo visual inspection. Measurement errors can increase significantly and without warning in gradual faults. Therefore, the exemplary method is proposed to identify and correct for gradual camera deterioration and faults in camera misalignment, in particular.

The method starts at S302. During a course of the camera's use, the natural scene (i.e., images that the camera acquires as part of its regular use) is periodically analyzed for determining potential displacement in the camera field of view. Accordingly, the image capture module 114 acquires a plurality of temporal related frames from the camera 120 at S304. In the contemplated embodiment, the image frames belong to a video that the camera captures at the scene. In other embodiments, however, the image frames can include a series of still shots captured by the camera in a short period.

The method first determines whether a potential camera displacement exists based on an analysis of the natural scene. In other words, diagnostic signals can be extracted from the scene directly. The system institutes a scene analysis in a first diagnostic phase at S305. Depending on the results, the system can implement further diagnostic actions and/or correct the fault. The analysis of the natural scene is performed by monitoring changes of estimated vanishing points or identified key-points (hereinafter referred to as 'objects') of the road scene from the acquired image frames. Generally, the changes are monitored between a reference frame and a current frame.

Therefore, the alignment determination module 116 determines if the current frame is a reference frame in a sequence at S306. A reference frame is defined herein as including a frame captured at a time instant when the camera 120 is free of misalignment error. The analysis (e.g. estimating the positions of vanishing points or identified key-points) may be performed on a plurality of frames over a substantially short period of time; and the average or other statistical measure, such as, median, min, max etc., of the results may be used as the reference. This approach is preferable to using the analysis of a single reference frame, since the camera system has noise.

For simplicity, the terms reference frame and/or current frame are used throughout the rest of the disclosure. It should be understood that a reference frame may include the analysis of a series of reference frames, which includes a plurality of frames over a substantially short period of time that is close to the reference time. Similarly, a current frame may include the analysis of a series of current frames, which includes a plurality of frames over a substantially short period of time that is close to the said current time.

For the current frame being the reference frame in the sequence (YES at S306), the system determines a pixel location of at least one reference object in the reference frame at S308. A reference object is defined herein as a selected fixed object or vanishing point in the scene. The reference object can include a stationary object and, more specifically, a stationary and permanent object, within the camera field of view. Non-limiting examples of objects can include a traffic indicator, such as a traffic light or sign, a lamppost, a building, a tollbooth, a roadway lane marker, and a combination of the above. The object that is selected for the scene analyses portion of the diagnostics routine can vary from site to site depending on the intended surveillance function of the camera. For example, for red light enforcement, a common scene element, such as the traffic light, can be selected as the object used in detecting camera displacement. However, noises, such as shaking of the traffic light, can result in detection errors. Because the impact of mild camera displacement on system performance is not large, the red light can still be used to detect gross displacement in a stop enforcement application.

However, a small camera displacement can result in a significant measured speed error for a camera that is used for speed measurement and/or enforcement. Slight camera displacement can upset the predetermined spatial calibration (pixels to real-world coordinates) of the camera. Furthermore, for a camera that is programmed to capture images when objects move across select pixel locations, the displacement affects the objects' locations when the images are captured. In a case where the object is a vehicle, the slight displacement can affect the optimal location for license plate reading. Therefore, there is no limitation made herein to the object selected. In one embodiment, the reference object can include vanishing points that are derived from image analysis of the frame. Detecting vanishing points from image analysis of an arbitrary scene is well-known in image processing technology and prior arts. For example, vanishing points can be estimated by finding the converging points of any two parallel lines or edges in the scene, such as, e.g., lane divider markers or rectangular road signs. Other examples, such as using general statistics of edge orientation in the scene, can be used for determining vanishing points. This reference object and corresponding location can be stored in a database 132 and accessed for the processing of subsequent frames.

For the current frame not being the reference frame in a sequence (NO at S306), the module determines at S310 a pixel location of the reference object in the current frame. In the contemplated embodiment, the current frame is analyzed to detect the reference object. Any process understood in the art can be used for locating the reference object in the current frame. The pixel location is determined where the detected reference object appears in the frame.

The identified pixel locations of the reference object in the reference frame and the current frame respectively are used in the first phase S305 of the diagnostic routine. In the contemplated embodiment, the alignment determination module 116 determines a displacement of the camera between the current frame and the reference frame at S312. However, other fault conditions of the camera can be measured by comparing different characteristics of the reference object between the reference and current frames. For example, in the case of camera that is out of focus, instead of using a comparison of pixel locations of the reference object, other characteristics can be used, such as, the sharpness (e.g. measured by average strength of edges) and/or scaling of the object size etc., for detecting whether the camera focus has changed over time.

For embodiments that use at least two reference objects for determining the camera displacement, a displacement is computed for each reference object. An average displacement is then computed for all the reference objects. Note that a use of at least two reference objects can be any combination of (i) using more than one reference object in a frame and (ii) using one reference object in a plurality of frames acquired over a substantially short period of time.

Continuing with FIG. 3, the computed displacement is compared to a first predetermined threshold $T_1$ at S314. Generally, the results of the comparison are used to rule out a fault in need of remediation. More specifically, for a displacement not exceeding the threshold value $T_1$ (NO at S314), the system recomputes the displacement after a predetermined number m of frames at S316. After recomputing the displacement after the $m^{th}$ frame, the process returns to S314 and the alignment determination module 116 compares the updated displacement with the threshold $T_1$. A displacement exceeding the threshold value $T_1$ (YES at S314) is indicative of the potential misalignment of the camera. In other words, the camera has potentially shifted since it was last calibrated. To confirm the determination, the system institutes the traffic test pattern analysis in a second diagnostic phase at S317.

However, because a potential fault that is detected from the natural scene can result from a noisy measurement, the first phase analysis at S305 can result in false readings. Therefore, an embodiment is contemplated as including an intermediate determination by comparing the displacement measurement in the scene analysis to a threshold κ1 as shown in S16 in FIG. 1.

In one embodiment, the threshold value $T_1$ can be based on a relationship between a measured parameter and a final output parameter. For example, in an embodiment including a speed enforcement traffic camera 120, the predetermined threshold $T_1$ can be based on a relationship between camera displacement and speed error. An allowable speed error limit can be used to find a corresponding displacement error threshold. In preferred embodiments, the predetermined threshold $T_1$ can consider a confidence in the accuracy of the scene analysis results, an impact of the resulting camera fault on the purpose of the traffic surveillance camera, and a cost of implementing the traffic test pattern analysis in the second diagnostic phase S317.

The traffic test pattern analysis of S317 differs from the scene analysis of S305 because it processes a test pattern that is inserted into the scene, rather than reference objects that happen to occur in the scene. One advantage of using test patterns includes better control of the reference objects (easier to identify, better placements in the FOV of the camera, etc.). Another advantage is that the diagnostic signals are scene independent (since test patterns can be unified to standard patterns and thus are not scene dependent), etc. More detailed advantages of test-pattern analysis can be found in U.S. Ser. No. 13/371,068, filed Feb. 10, 2012, titled "Traffic Camera Diagnostics via Test Targets", by Wencheng Wu et al, the contents of which are entirely incorporated herein. This phase S317 can provide for greater accuracy of measuring displacement because specially designed test patterns and corresponding analyses result in better diagnostic signals without being limited to what the scene can offer. For diagnosing traffic camera displacement, a test pattern based method can be implemented as described in the '068 disclosure.

The second phase S317 starts by introducing at least one additional object to the camera field of view. In one embodiment, the additional object is a test target with predetermined reference position markers. In one embodiment, the test target, such as a set of bright reflectors on a 1 ft×1 ft grid, can be placed on a moving object that carries the target across the scene. In this manner, the position of the target changes from frame to frame. In another embodiment, the additional object can include a stationary object of known location being introduced into the camera field of view. Non-limiting examples of stationary objects can include a sign, a traffic cone, a man-made object, and a combination of above. Namely, the object is not limited to any one object, but can include any object easily identified by image analysis.

The selected test pattern can be based on the type of camera fault that is being diagnosed. The information provided by the scene analysis can be used as a guide for the design of the test-pattern. In one example, a ladder chart can be used for a suspected blur-based or out-of-focus type fault. In another example, a grid of reflectors can be used for a likely camera displacement. Accordingly, one aspect of performing the scene analysis in the first phase S305 is that the results enable a smaller, and more custom, set of test patterns to be deployed in the second phase S317.

The diagnostic response module 118 measures a new displacement at S318 by analyzing images/frames, which are acquired during the time when the inserted additional test patterns/objects are present in the scene. That is, S318 only operates when the inserted test patterns/objects are temporarily present in the scene. Because an insertion of test patterns/objects implies a cost (such as the cost of sending a vehicle carrying the test target or the cost of interrupting traffic to temporarily place the stationary objects), the second phase S317 preferably is executed only when a potential fault is detected from the natural scene S305. The new computed displacement is compared to a predetermined threshold $T_2$ at S320. In the case of camera misalignment, S26 can be omitted in FIG. 1 since it is desired to correct the misalignment via camera re-calibration if possible.

Continuing with FIG. 3, for a displacement not exceeding the threshold value $T_2$ (NO at S320), the diagnostic response module 118 automatically recalibrates the camera using the additional object at S322. Mild camera misalignment can be remedied without sending a maintenance crew. For example, the collected test pattern data can be used to derive an updated camera calibration as discussed in U.S. Ser. No. 13/527,673, titled "Camera Calibration Application" by Martin H. Hoover et al., the contents of which are incorporated herein in their entirety. One aspect of a calibration response resulting in this phase S317 is that the extra cost of dispatching a maintenance crew is not incurred. The module 118 computes a determined pixel location and corresponding known physical location of the additional object at S322. Accordingly, the pixel location and the additional object are stored in the database 132. A change of the camera's field of view can be incorporated into the speed measurement by updating the calibration.

Continuing with FIG. 3, a maintenance crew may need to reposition the camera for a larger displacement or for instances when calibration cannot remedy the problem, such as, for example, when the misalignment is severe, when faults are caused by near-field blockage, during out-of-focus conditions, and/or when there is illuminator failure, etc. A displacement exceeding the threshold value $T_2$ (YES at S320) confirms that the camera has incurred a serious fault and that the camera is in need of on-site repair, maintenance, and/or replacement. The diagnostic response module 118 provides suitable notification of the detected fault at S326 to a user device 106. The notification can include an instruction for the maintenance crew to visit the camera site. In further contemplated embodiments, the notification can indicate a type and/or cause of the fault, and it can indicate and/or suggest the necessary (e.g., replacement) parts that the crew need to bring to the camera site.

Because this response, i.e., sending a maintenance crew, can be the most expensive in a series of options, it is the last resort for many applications. Therefore, one aspect of the discussed process is to minimize false alarms which can needlessly initiate this response. Additionally, the diagnostic information that is provided by earlier steps (S305) can reduce the cost for this response (S326), such as costs associated with frequently deploying a test target and with sending maintenance crews to revisit sites.

The process continues by determining if the current frame is the last frame in the acquired sequence at S328. For the current frame not being the last frame (NO at S328), the system sets the next frame as the current frame at S330 and returns to S310 for processing the next frame. For the current frame being the last frame in the sequence (YES at S328), the method ends at S332. Note that it is often unnecessary to analyze each frame acquired by the camera for the purpose of diagnostics. Though it is not explicitly stated, it should be understood that the term "current" frame may mean the frames that are currently being analyzed for camera fault diagnostics, which may be requested by the system at a regular schedule (such as every hour during the day and every 4 hours at night) or an irregular schedule (such as one week after the last camera maintenance) or a combination of both.

Although the present disclosure uses a test pattern to improve diagnostic signals provided by a scene analysis diagnostic approach, other embodiments are contemplated to use a test pattern for providing auxiliary or complementary diagnostic signals. For example, test patterns can be used to help a scene analyzer understand the scene (e.g. road geometry and travel directions) in addition to the earlier discussed aspect of providing more precise measurements of certain diagnostic signals. In one embodiment, the scene analysis can be used to determine a cause of a fault while the test pattern analysis can be used to determine whether the fault is relevant to the purpose of the camera.

The underlying concept for this disclosure is to use a lower cost scene analysis approach as a first level of defense for camera diagnostics and to use a more accurate test pattern approach for confirmation when necessary.

Although the method in FIGS. 1 and 3 are illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

The method illustrated in FIGS. 1 and 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 1 and 3 can be used to implement the method.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for determining a response to misalignment of a camera monitoring a desired area, said method comprising:
    acquiring a plurality of temporal related frames from said camera, one of said frames being a reference frame;
    determining a pixel location of at least one reference object in said reference frame and a current frame;
    determining a displacement of said camera by comparing said pixel location of said at least one reference object in said current frame and said reference frame;
    comparing said displacement to a first displacement error threshold;
    for said displacement not exceeding said first displacement error threshold, determining an updated displacement of said camera after a predetermined number of frames and comparing said updated displacement to said first threshold;
    for said displacement exceeding said first displacement error threshold, measuring a new displacement of said camera by introducing at least one additional object to a camera field of view, and comparing said new displacement to a second displacement error threshold;
    for said new displacement not exceeding said second displacement error threshold, automatically recalibrating said camera using a determined pixel location and corresponding known physical location of said at least one additional object; and,
    for said new displacement exceeding said second displacement error threshold, providing suitable notification of a detected misalignment to an associated user device.

2. The method of claim 1, wherein said at least one reference object is selected from a group consisting of:
    stationary objects within said camera field of view; and,
    vanishing points derived from image analysis of said frame.

3. The method of claim 1, wherein determining said pixel location of at least one reference object includes:
    analyzing said frame to detect said object appearing in said frame; and,
    determining said pixel location where said detected object appears in said frame.

4. The method of claim 1, wherein for said frames including at least two reference objects, determining said camera displacement comprises:
    computing a displacement for each reference object; and,
    computing an average displacement for said at least two reference objects.

5. The method of claim 1, wherein said additional object is one of a test target with predetermined reference position markers, present in or moving through said area and a stationary object of known location being situated within said camera field of view and being selected from a group consisting of: a sign, a traffic cone, any man-made objects that can be easily identified by image analysis; and, a combination of said above.

6. The method of claim 2, wherein said stationary object is situated within said camera field of view and is a defined part of an object selected from a group consisting of: a traffic signal light, a traffic sign, a lamppost, a building, a tollbooth, a roadway lane marker, and a combination of said above.

7. An apparatus that executes said method of claim 1.

8. A non-transitory machine-readable medium including a computer program which when executed performs said method of claim 1.

9. A system for determining a response to misalignment of a camera monitoring a desired area, said system comprising a computer device including a memory in communication with a processor configured to:
    acquire a plurality of temporal related frames from said camera, one of said frames being a reference frame;
    determine a pixel location of at least one reference object from said frames in said reference frame and a current frame;
    determine a displacement of said camera by comparing said pixel location of said at least one reference object in said current frame and said reference frame;
    compare said displacement to a first displacement error threshold;
    for said displacement not exceeding said first displacement error threshold, determine an updated displacement of said camera after a predetermined number of frames and compare said updated displacement to said first displacement error threshold;
    for said displacement exceeding said first displacement error threshold, measure a new displacement of said camera by introducing at least one additional object to a camera field of view, and compare said new displacement to a second displacement error threshold;
    for said new displacement not exceeding said second displacement error threshold, automatically recalibrate said camera using a determined pixel location and corresponding known physical location of said at least one additional object; and,
    for said new displacement exceeding said second displacement error threshold, provide suitable notification of a detected misalignment to an associated user device.

10. The system of claim 9, wherein said at least one reference object is selected from a group consisting of:
a stationary object within said camera field of view; and,
vanishing points derived from image analysis of said frame.

11. The system of claim 9, wherein said processor is further configured to:
analyze said current frame to detect said object appearing in said current frame; and,
determine said pixel location where said detected object appears in said current frame.

12. The system of claim 9, wherein for said frames including at least two reference objects, said processor is further configured to:
compute a displacement for each reference object; and,
compute an average displacement for said at least two reference objects.

13. The system of claim 9, wherein said additional object is one of a test target with predetermined reference position markers, present in or moving through said area and a stationary object of known location being situated within said camera field of view and being selected from a group consisting of: a sign, a traffic cone, any man-made objects that can be easily identified by image analysis; and, a combination of said above.

14. The system of claim 10, wherein said stationary object is situated within said camera field of view and is a defined part of an object selected from a group consisting of: a traffic signal light, a traffic sign, a lamppost, a building, a tollbooth, a roadway lane marker, and a combination of said above.

15. The system of claim 9 further comprising:
an image capture device in communication with said computer device and being adapted to capture said plurality of frames and transmit pixel data describing at least one select frame to said image capture module.

16. The system of claim 9 further comprising:
a user device in communication with said computer device, said user device including a graphical user interface for outputting said notification to a user.

17. The system of claim 9 further comprising:
a storage device in communication with said computer device and being adapted to store said pixel location of at least one reference object in said reference frame.

* * * * *